(12) United States Patent
Thomas et al.

(10) Patent No.: US 8,167,071 B2
(45) Date of Patent: May 1, 2012

(54) ENGINE HOOD FOR A MOTOR VEHICLE

(75) Inventors: Peter Thomas, Schellbronn (DE);
Klaus-Dieter Wolf, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 777 days.

(21) Appl. No.: 12/266,859

(22) Filed: Nov. 7, 2008

(65) Prior Publication Data

US 2009/0120704 A1 May 14, 2009

(30) Foreign Application Priority Data

Nov. 8, 2007 (DE) .......................... 10 2007 053 171

(51) Int. Cl.
*B62D 25/10* (2006.01)
(52) U.S. Cl. ............... 180/69.2; 180/69.21; 296/193.11
(58) Field of Classification Search ................ 180/69.2, 180/69.21; 296/193.11
See application file for complete search history.

(56) References Cited

U.S. PATENT DOCUMENTS

| | | | | |
|---|---|---|---|---|
| 4,598,008 A | * | 7/1986 | Vogt et al. .................... | 428/117 |
| 4,634,167 A | * | 1/1987 | Moriki et al. .................. | 296/76 |
| 5,115,878 A | * | 5/1992 | Hayata ......................... | 180/69.21 |
| 5,124,191 A | * | 6/1992 | Seksaria ....................... | 428/178 |
| 5,605,371 A | * | 2/1997 | Borchelt et al. ............. | 296/187.09 |
| 5,706,908 A | * | 1/1998 | Sakai et al. .................. | 180/69.2 |
| 6,048,022 A | * | 4/2000 | Ishibashi et al. ............ | 296/187.09 |
| 7,052,075 B2 | * | 5/2006 | Kamada et al. ............. | 296/187.01 |
| 7,055,894 B2 | * | 6/2006 | Ikeda et al. .................. | 296/187.09 |
| 7,090,289 B2 | * | 8/2006 | Koura ........................... | 296/193.11 |
| 7,140,673 B2 | * | 11/2006 | Ito et al. ....................... | 296/193.11 |
| 7,147,273 B2 | * | 12/2006 | Ikeda et al. .................. | 296/193.11 |
| 7,150,496 B2 | * | 12/2006 | Fujimoto ..................... | 296/187.04 |
| 7,354,101 B2 | * | 4/2008 | Donabedian et al. ...... | 296/193.11 |
| 7,377,580 B1 | * | 5/2008 | Ekladyous ................... | 296/193.11 |
| 7,399,028 B1 | * | 7/2008 | Castillo et al. .............. | 296/193.11 |
| 7,467,680 B2 | * | 12/2008 | Mason .......................... | 180/69.2 |
| 7,481,488 B2 | * | 1/2009 | Ikeda et al. .................. | 296/193.11 |
| 7,488,031 B2 | * | 2/2009 | Ishitobi ........................ | 296/193.11 |
| 7,497,507 B2 | * | 3/2009 | Matsushima et al. ...... | 296/193.11 |

(Continued)

FOREIGN PATENT DOCUMENTS

DE 195 14 324 A1 12/1995

(Continued)

OTHER PUBLICATIONS

German Search Report dated Jul. 24, 2008 w/English translation of pertinent portion (nine (9) pages).

*Primary Examiner* — Jeffrey J Restifo
(74) *Attorney, Agent, or Firm* — Gerald E. Hespos; Michael J. Porco

(57) ABSTRACT

An engine hood for a motor vehicle has an outer planking and an inner part. Between the outer planking and the inner part, a supporting part is arranged, which reinforces the outer planking. In order to reduce the manufacturing costs for an engine hood while maintaining a favorable delay pattern in the event of a head impact, the supporting part has supporting elements which, in the event of an essentially vertical admission of force, permit a displacement of the outer planking relative to the inner part until the supporting part rests with its predominant surface against the inner part.

19 Claims, 4 Drawing Sheets

U.S. PATENT DOCUMENTS

| | | | |
|---|---|---|---|
| 7,578,548 B2 * | 8/2009 | Behr et al. | 296/193.11 |
| 7,635,157 B2 * | 12/2009 | Wang et al. | 296/193.11 |
| 7,690,720 B2 * | 4/2010 | Wang et al. | 296/193.11 |
| 7,735,908 B2 * | 6/2010 | Wang et al. | 296/193.11 |
| 7,810,877 B2 * | 10/2010 | Ishitobi | 296/193.11 |
| 7,984,943 B2 * | 7/2011 | Iwano et al. | 296/193.11 |
| 8,016,347 B2 * | 9/2011 | Uchino | 296/193.11 |
| 2004/0021342 A1 * | 2/2004 | Fujimoto | 296/193.11 |
| 2004/0182616 A1 * | 9/2004 | Mason | 180/69.21 |
| 2005/0082874 A1 * | 4/2005 | Ikeda et al. | 296/193.11 |
| 2006/0220418 A1 * | 10/2006 | Behr et al. | 296/187.04 |
| 2007/0235237 A1 * | 10/2007 | Wallman et al. | 180/69.2 |
| 2008/0007094 A1 * | 1/2008 | Ishitobi | 296/193.11 |
| 2008/0066983 A1 * | 3/2008 | Kimoto et al. | 180/69.2 |
| 2008/0122261 A1 * | 5/2008 | Seo | 296/193.11 |
| 2009/0025995 A1 * | 1/2009 | Wang et al. | 180/69.2 |
| 2009/0065277 A1 * | 3/2009 | Wang et al. | 180/69.2 |
| 2009/0120704 A1 * | 5/2009 | Thomas et al. | 180/69.2 |
| 2010/0019540 A1 * | 1/2010 | Fujimoto | 296/193.11 |

FOREIGN PATENT DOCUMENTS

| | | |
|---|---|---|
| DE | 100 38 812 A1 | 2/2002 |
| DE | 101 36 898 A1 | 2/2003 |
| DE | 102 59 591 A1 | 7/2004 |
| DE | 103 31 066 A1 | 2/2005 |
| DE | 10 2004 048 504 A1 | 4/2006 |
| DE | 10 2004 053 020 A1 | 5/2006 |
| DE | 10 2005 050 110 A1 | 4/2007 |
| GB | 2 434 125 A | 7/2007 |
| JP | 2004-50909 A | 2/2004 |
| JP | 2006-44544 A | 2/2006 |
| JP | 2007-30693 A | 2/2007 |
| WO | WO 03/011660 A1 | 2/2003 |

* cited by examiner

ENGINE HOOD FOR A MOTOR VEHICLE

CROSS REFERENCE TO RELATED APPLICATIONS

This application claims priority under 35 U.S.C. §119 to German Patent Application No. 10 2007 053171.2, filed Nov. 8, 2007, the entire disclosure of which is herein expressly incorporated by reference.

BACKGROUND AND SUMMARY OF THE INVENTION

The invention relates to an engine hood for a motor vehicle having an outer planking and an inner part. Between the outer planking and the inner part, a supporting part is arranged which reinforces the outer planking.

In order for an engine hood to absorb sufficient energy in case of an impact with a pedestrian, it is known from production vehicle construction to arrange the engine hood at a sufficient distance above the assemblies arranged below the engine hood. The determination of the so-called HIC (head injury criterion) indicates whether an engine hood meets the legal requirements.

From International patent document WO 03/011660 A1, it is known to equip an outer planking or cover with a reinforcing layer. The reinforcing layer is arranged above the outer planking and is connected with the outer planking. The reinforcing layer consists of a brittle material, so that the hood has a buckling strength required for normal operation. In the case of a dynamic loading, for example, in the event of a head impact, the supporting layer will break while absorbing energy, so that a deceleration pattern occurs that is favorable for a head impact.

However, as a result of the different materials, the manufacturing expenditures are increased.

It is an object of the invention to reduce the manufacturing costs for an engine hood of a motor vehicle while maintaining a favorable deceleration pattern in the event of a head impact.

According to the invention, an engine hood for a motor vehicle has an outer planking and an inner part, between the outer planking and the inner part a supporting part being arranged which reinforces the outer planking. The supporting part has supporting elements which, in the event of an essentially vertical admission of force, permit a displacement of the outer planking relative to the inner part until the supporting part rests with its predominant surface against the inner part.

Advantageous further developments of the invention are described and claimed herein.

According to the invention, a supporting part reinforcing the outer planking is to be provided between the outer planking and an inner part, particularly in the forward region of the engine hood, which supporting part has supporting elements that, in the event of a vertical admission of force, permit a displacement of the outer planking relative to the inner part until the supporting part rests with its predominant surface against the inner part.

Within the context of the invention, supporting elements are such that, up to a certain degree, they are held in a flexible or elastic manner; that is, when the force effect is low (for example, during a normal driving operation or when opening or closing the engine hood), the supporting elements move back into their initial position; when the force exceeds a previously defined value, the supporting elements deform plastically while absorbing energy. In this case, the supporting elements can either support themselves at the inner part or the outer planking supports itself on the supporting elements.

The supporting part itself together with its supporting elements can be constructed as a sheet metal part, particularly as a deep-drawn part, so that the same materials are processed together.

A reinforcement of the engine hood in the forward region can be achieved when the inner part and the outer planking at least partially form a closed hollow profile.

In order to obtain a favorable delay pattern also in the event of a pedestrian impact in the edge regions of the engine hood, the supporting part can extend essentially over almost the entire engine hood width.

The supporting part, preferably, is a flat component whose essential dimensional surface may be constructed to be planar but may also be physically curved. It is recommended that the dimensional surface of the supporting part at least partially follow the course of the outer planking. In order to implement the desired relative movement of the supporting part with the outer planking with respect to the inner part, supporting elements may project at an angle from the dimensional surface of the supporting part.

Optionally, the supporting elements may project from the supporting part in a step-shaped manner in the direction of the inner part, in which case the supporting elements may project from the longitudinal sides of the supporting part in the direction of the inner part.

In an alternative embodiment, the supporting elements may project in the direction of the outer planking, in which case several supporting elements are arranged side-by-side in the transverse direction of the vehicle distributed over the width of the engine hood.

In a longitudinal sectional view, in an alternative embodiment, the supporting part may extend in a step shape within the hollow profile. This has the advantage that, in the event of a vertical force, this step bends open while additionally absorbing energy.

This step may be defined in that the supporting part extends from an approximately horizontally extending floor wall to an approximately vertically extending rearward face wall of the inner part. Under the effect of a force, a forced movement of the supporting part is therefore made possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
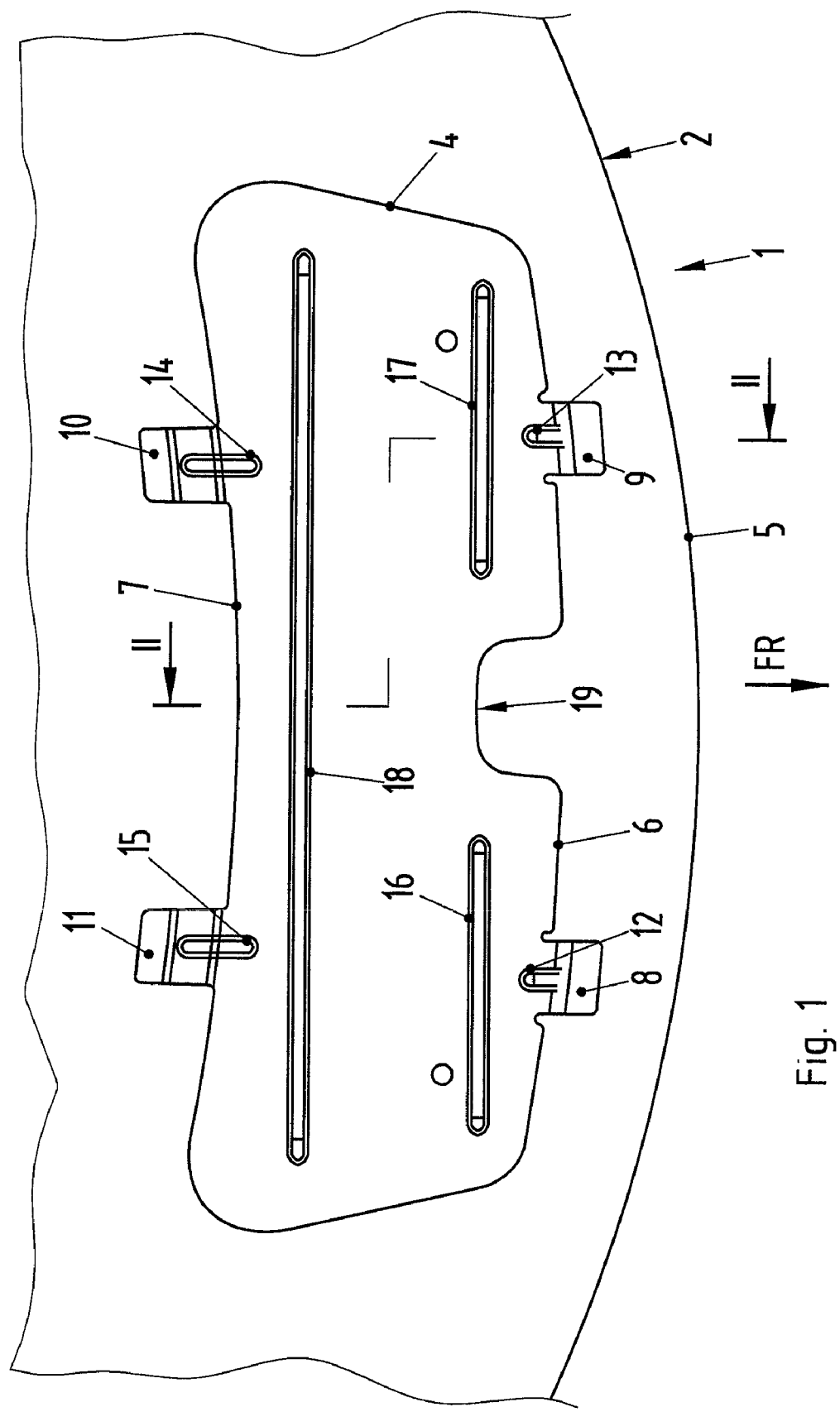
FIG. 1 is a top view of an engine hood with a supporting part in a first embodiment.
Figure 2:
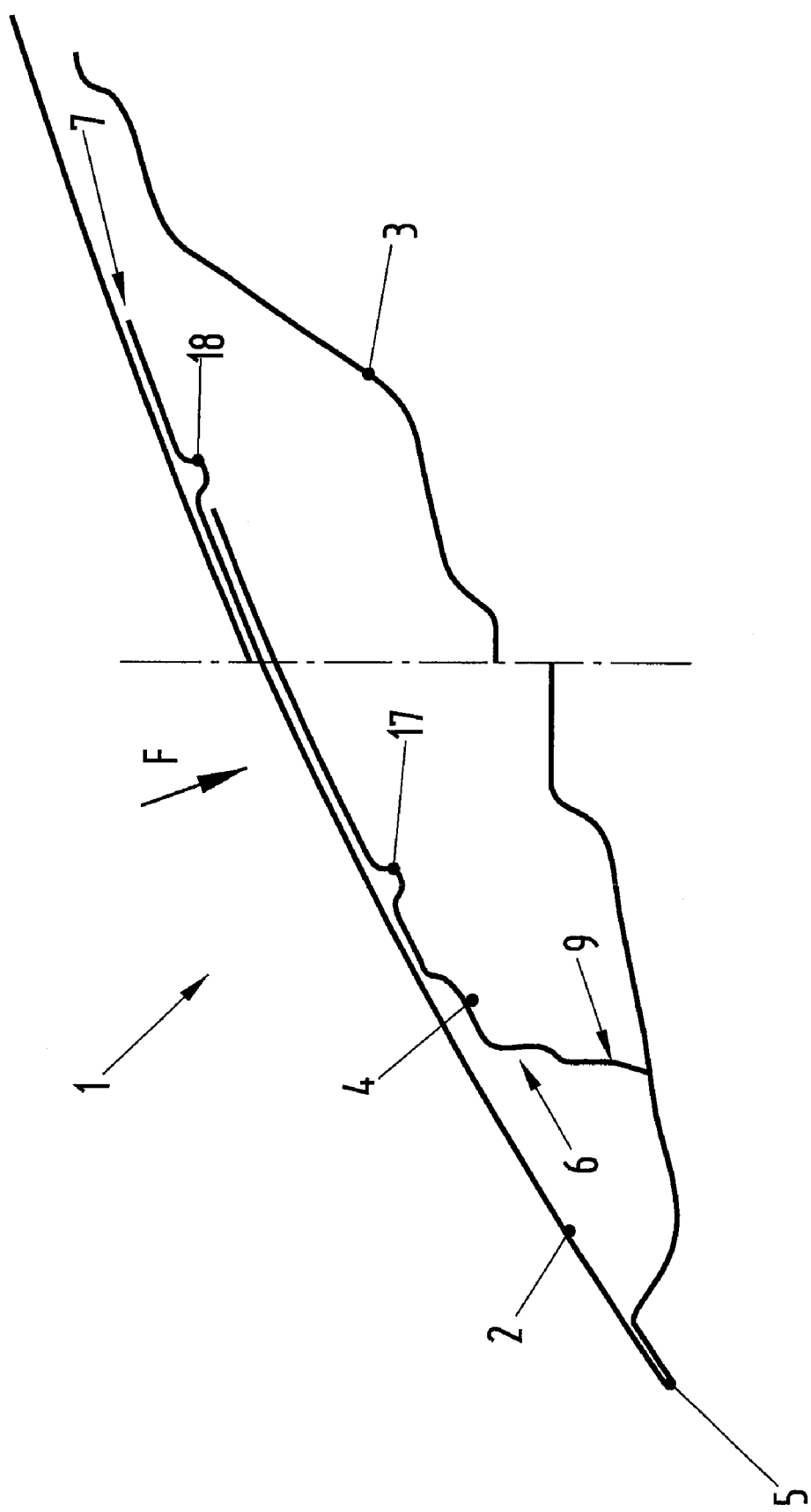
FIG. 2 is a sectional view according to Line II-II in FIG. 1.

FIGS. 1 and 2 show a first embodiment of an engine hood 1 according to the invention. In this case, the engine hood 1 includes an outer planking 2, an inner part 3, as well as a reinforcing supporting part 4. The inner part 3 and the outer planking 2 are mutually connected at the forward end edge 5 of the engine hood 1. In the further longitudinal course of the engine hood 1, the outer planking 2 can support itself on the inner part 3 on additional regions (which are not shown in detail).

The supporting part 4 is used for reinforcing the engine hood 1 in its forward region. The supporting part 4 has an essentially square construction and extends over approximately the entire engine hood width. Supporting elements 8 to 11 are shaped onto the forward longitudinal side 6 and the rearward longitudinal side 7, which supporting elements 8 to 11—in the cross-sectional view—extend in a step shape from the inner part 3 to the main dimensional plane of the supporting part 4. The main dimensional plane of the supporting part 4 extends approximately parallel to the contour of the outer planking 2. For a reinforcement in the transverse direction of the vehicle, each of the supporting elements 8 to 11 has a longitudinal bead 12 to 15.

In its main dimensional plane, the supporting part 4 is equipped with transverse beads 16, 17 and 18 in order to reinforce the outer planking 2. A recess 19 is provided in the region of the engine hood lock in the forward longitudinal side 6.

Because of the large-surface of the supporting part 4 resting against the interior side of the outer planking 2, in the event of a pedestrian impact, at first both parts, i.e., the supporting part 4 and the outer planking 2, together are displaced in the direction of the inner part 3. Under a further effect of the force according to arrow F, the supporting elements 8 to 11 will yield until the supporting part 4 rests against the inner part 3. The supporting elements yield elastically only under the effect of a slight static force. When a defined force is exceeded, the supporting elements deform plastically.

It is only when the supporting part 4 with the outer planking 2 rests predominantly on the inner part 3 that the entire forward hood region, as a whole, is displaced downward.

Figure 3:
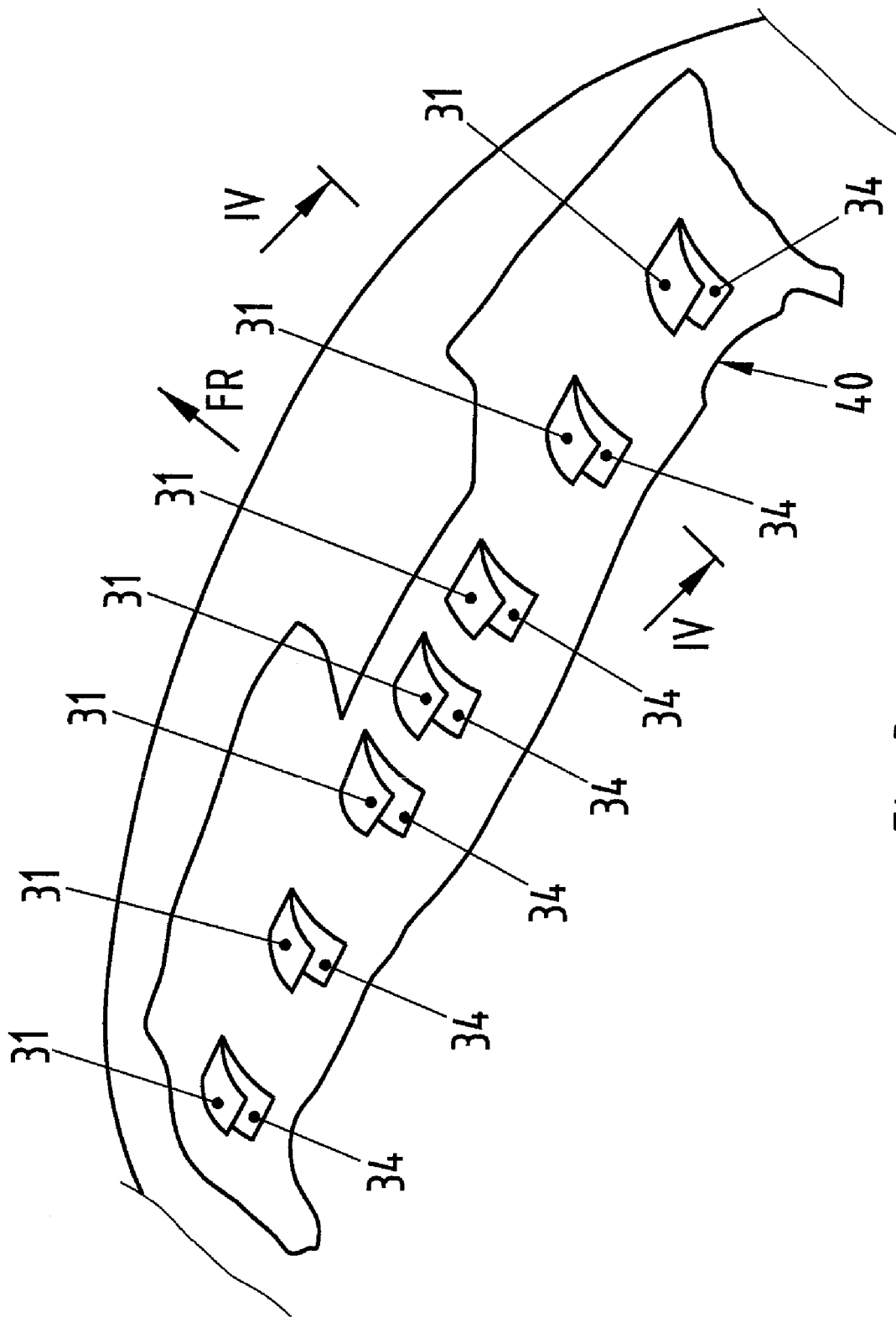
FIG. 3 is a perspective view diagonally from the rear of a second embodiment of a supporting part.
Figure 4:
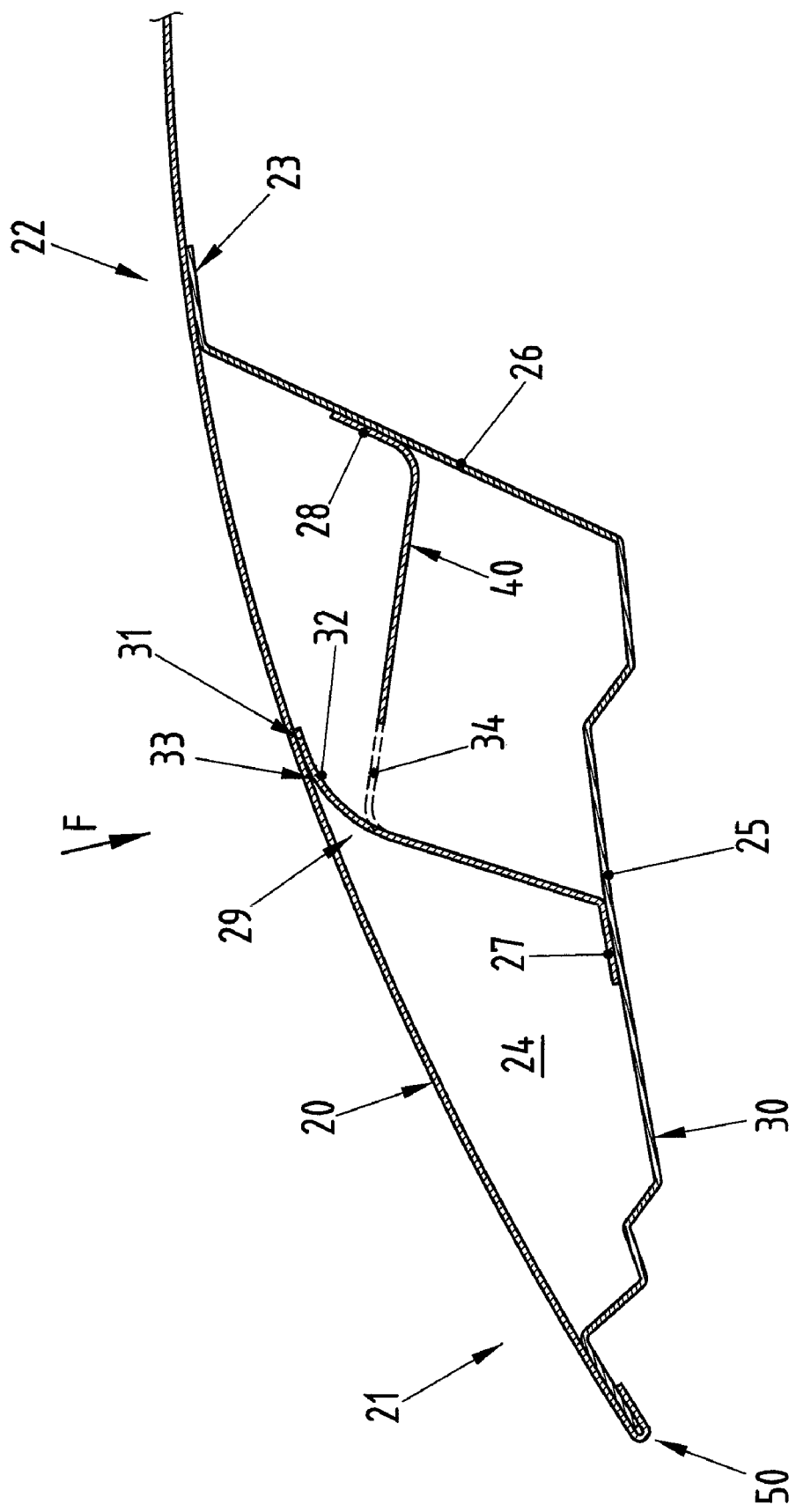
FIG. 4 is a sectional view according to Line IV-IV in FIG. 3.

FIGS. 3 and 4 illustrate a second embodiment. Here also, a supporting part 40 is arranged between an inner part 30 and an outer planking 20, in which case the inner part 30 and the outer planking 20 partially form a closed hollow profile 24. For this purpose, the inner part 30 is encompassed or bordered on the forward end edge 50 of the engine hood 21 by the outer planking 20 In the rearward region 22, the inner part is fastened by means of a flange 23 on the outer planking 20.

Within the thereby formed hollow profile 24, the supporting part 40 extends in a step-shaped manner from an approximately horizontally extending floor wall 25 to an approximately vertically extending rearward face wall 26 of the inner part 30. For the support, the supporting part 40 has flanges 27, 28 on its forward longitudinal side 60 and on the rearward longitudinal side 70, by which flanges 27, 28, the supporting part 40 can support itself on the inner part 30. Several deformable supporting elements 31 in the form of sheet metal lugs 32 cut free from the supporting part 40 and bent away upward project from the step-type edge 29. The supporting part 40 is glued to the outer planking 20 only at the top side 33 of the sheet metal lugs 32. As a result, in the event of a pedestrian impact according to a force effect in the direction of the arrow F, the sheet metal lugs 32 can first be bent in elastically in the direction of their recesses 34 and, in the further course, while reducing energy, can be bent in plastically.

In the further course of the pedestrian impact, the supporting part deforms by bending open the step in the direction of the inner part 30. The flanges 27 and 28 support this bending-open in that they are not glued or otherwise fastened to the inner part 30. It is only when the supporting part 40 has a large-surface contact with the inner part 30 that the forward engine hood region as a whole—thus, the outer planking 20, the inner part 30 and the supporting part 40 together—is displaced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An engine hood for a motor vehicle, comprising:
    an outer planking having an outer periphery, an outwardly facing surface and an inwardly facing surface;
    an inner part having an outer periphery connected to the outer periphery of the outer planking and an outwardly facing surface opposed to and spaced from the inwardly facing surface of the outer planking at all locations spaced from the outer peripheries of the outer planking and the inner part;
    a supporting part operatively arranged between the outer planking and the inner part, the supporting part reinforcing the outer planking;
    wherein the supporting part comprises an outer periphery, supporting elements extending from spaced apart positions on the outer periphery of the supporting part into supporting contact with the inner part, all of the supporting part other than the supporting elements being spaced from the inner part and being opposed to and substantially parallel to the outer planking, and the supporting elements permitting a displacement of the outer planking relative to the inner part in an event of an essentially vertical force applied to the outer planking until a predominant surface of the supporting part rests against the inner part.

2. The engine hood according to claim 1, wherein the inner part and the outer planking at least partially formed a closed hollow profile.

3. The engine hood according to claim 2, wherein the supporting part extends essentially over almost an entire engine hood width.

4. The engine hood according to claim 3, wherein, in a longitudinal sectional view, the supporting part extends in a step shape inside the hollow profile.

5. The engine hood according to claim 2, wherein, in a longitudinal sectional view, the supporting part extends in a step shape inside the hollow profile.

6. The engine hood according to claim 5, wherein the supporting part extends from an approximately horizontally extending floor wall to an approximately vertically extending rearward face wall of the inner part.

7. The engine hood according to claim 1, wherein the supporting part extends essentially over almost an entire engine hood width.

8. The engine hood according to claim 7, wherein the supporting elements project at an angle from a major dimensional surface of the supporting part.

9. The engine hood according to claim 8, wherein the supporting elements project in a step shape in the direction of the inner part.

10. The engine hood according to claim 8, wherein the supporting elements project from longitudinal sides of the supporting part in the direction of the inner part.

11. The engine hood according to claim 1, wherein the supporting elements project at an angle from a major dimensional surface of the supporting part.

12. The engine hood according to claim 11, wherein the supporting elements project in a step shape in the direction of the inner part.

13. The engine hood according to claim 12, wherein the supporting elements project in the direction of the outer planking.

14. The engine hood according to claim 13, wherein several supporting elements are arranged side-by-side in a transverse direction of the vehicle distributed over the width of the engine hood.

15. The engine hood according to claim 11, wherein the supporting elements project from longitudinal sides of the supporting part in the direction of the inner part.

16. The engine hood according to claim 15, wherein the supporting elements project in the direction of the outer planking.

17. The engine hood according to claim 16, wherein several supporting elements are arranged side-by-side in a transverse direction of the vehicle distributed over the width of the engine hood.

18. The engine hood according to claim 11, wherein the supporting elements project in the direction of the outer planking.

19. The engine hood according to claim 18, wherein several supporting elements are arranged side-by-side in a transverse direction of the vehicle distributed over the width of the engine hood.

* * * * *